Patented Oct. 16, 1945

2,386,927

UNITED STATES PATENT OFFICE 2,386,927

PROCESS FOR SEPARATING DIOLEFINS

James H. Boyd, Jr., Bartlesville, Okla., assignor to Phillips Petroleum Company, a corporation of Delaware No Drawing. Application March 22, 1941, Serial No. 384,757

4 Claims. (Cl. 202—41)

This invention relates to the separation of diolefins from mixtures containing the same, and more particularly to the use of certain organic solvents in effecting said separation.

Diolefins may be produced by many different methods, one of the most common being the cracking or dehydrogenation of petroleum oils and gases. In many such methods, the diolefins are found in an impure state, being admixed with hydrogen and with mono-olefins and/or paraffins of various boiling points, as the chief impurities. For most chemical processes in which diolefins are used commercially, it is desirable to have a relatively high concentration of diolefins available and this is especially true when the diolefins are to be used to form rubber-like polymers, a purity of 95% or better being sometimes required for this purpose. While the hydrogen and the hydrocarbons having boiling points considerably different from the diolefins being purified may be removed easily by fractional distillation, it is very difficult to separate the diolefins from those hydrocarbons having boiling points close to the diolefins, since very efficient fractionation is required, and this is not commercially feasible in most cases, particularly when azeotropes are formed by the diolefins and impurities.

Because of the difficulty of obtaining substantially pure diolefins by distillation methods alone, solvent extraction has been utilized in an attempt to separate diolefins in a high state of purity from hydrocarbon mixtures. While it is comparatively easy to make such a separation from paraffin hydrocarbons, it has been found that the separation from mono-olefins is more difficult because many solvents which are selective for diolefins have a considerable affinity for mono-olefins also.

It is an object of this invention to provide a process for the separation of diolefins from hydrocarbon mixtures containing the same.

Another object of this invention is to provide a process for such separation whereby diolefins of almost any desired purity may be obtained in a commercially practicable manner.

A further object of this invention is to provide a process which is operable in separating diolefins from hydrocarbon mixtures of relatively wide boiling range, and is especially useful for mixtures of narrow boiling range which do not lend themselves to separation by simple fractional distillation.

A still further object of this invention is to provide a group of solvents which is especially useful for accomplishing the separation of diolefins, the conjugated diolefins and butadienes in particular, from other hydrocarbons, the term "butadienes" referring to such hydrocarbons as butadiene, methyl butadiene, dimethyl butadiene, isoprene, and derivatives thereof such as chloroprene.

It has now been found that a certain group of solvents is very effective in the separation of diolefins from other hydrocarbons. These solvents may be applied to the hydrocarbon mixture in a number of different ways, which will be described below. The properties which make these solvents particularly desirable are, in addition to their high solvent power for diolefins, their relatively high boiling point, and the fact that they have less affinity for mono-olefins than many of the other solvents which have been proposed for this purpose; that is, the solvents show very good selectivity between diolefins and mono-olefins.

The solvents found suitable in accordance with this invention are compounds described by the type formula

wherein $R_1$ is hydrogen, an alkyl group, or an alkylol group, $R_2$ is an alkyl group or an alkylol group, X is an aliphatic residue having one or more carbonyl groups or an alkyl ester thereof, and Y is hydrogen, an alkyl group, or a mono- or dialkylamino group. Compounds having the aforesaid structure may be mono- or di-alkyl or alkylol N-substituted aliphatic acid amides, mono- or di-alkyl or alkylol N-substituted aliphatic amino aldehydes, mono- or di-alkyl or alkylol N-substituted aliphatic amino ketones, alkyl esters of mono- or di-alkyl or alkylol N-substituted amino acids, or other complex compounds which have a combination of several of the above named groups, being limited, however, by the structural formula shown above. Some representative examples of the solvents of this invention are dimethyl formamide, ethyl acetamide, dipropyl formamide, dimethyl acetamide, N-propyl beta amino butyraldehyde, N,N-ethyl propyl 4-amino-butanone-2, N,N-dimethyl ethyl alaninate, tetramethyl urea, ethanol formamide (N-beta-hydroxyethyl formamide).

In carrying out this invention, the use of dimethyl formamide, either alone or admixed with other compounds from the class described, has been selected for the purpose of illustration, although any of the compounds may be used in a generally similar manner. Most of the compounds are liquid at ordinary atmospheric temperatures and may be used alone, or in mixtures, while those few which are solids may be advantageously used by adding them to other solvents either for the purpose of decreasing the solvent volatility or for increasing the specificity of the solvents for diolefins over mono-olefins. Of course, any of the solvents of this invention may also be used by mixing with other known solvents in suitable proportions, advantageously with hydroxylated solvents such as water and aliphatic alcohols such as methanol, ethanol, isopropanol, ethylene glycol or glycerine.

A principal advantage to be gained by the use of the solvents of this invention is the control of hydrocarbon solubility in solvent mixtures. Thus, the use of larger or smaller amounts of certain solvents of this invention in which hydrocarbons are relatively insoluble, for instance ethanol formamide, in a mixture of solvents permits the total amount of hydrocarbon dissolved in the solvent mixture under given conditions to be increased or decreased so as to give the most satisfactory solvent for and particular diolefin-containing mixture being treated by any method of extraction.

In the separation of hydrocarbon mixtures containing diolefins, these solvents may be used in any way known to the art. For instance, a diolefin-containing gas may be passed upwardly in a scrubbing tower counter-current to a stream of solvent, at any suitable temperature and either at about atmospheric pressure or at elevated pressures. The solvent bearing dissolved diolefins is removed from the bottom of the tower and the diolefins are recovered by heating and/or reducing the pressure. The high boiling points of the above-named solvents makes possible a very easy recovery of the diolefins, since the solvents are relatively non-volatile. Thus, only a very small proportion of the vapors removed will be solvent, and this vaporized solvent is easily separated from the diolefin vapors. The method of recovering diolefins from solvent is essentially the same regardless of the method of extraction used.

Another manner of separating diolefins from other hydrocarbons is to liquefy the diolefin-containing hydrocarbon mixture by compression and/or cooling, and then to contact the liquid hydrocarbons with a solvent, either in batch or continuous operation, at a temperature low enough that two phases are formed, one being rich in solvent and diolefins, and the other being rich in the other hydrocarbons and containing more or less solvent, depending upon the solvent used, the temperature, pressure, etc. Separation of the extract phase, which is rich in diolefins, from the hydrocarbon or raffinate phase and subjecting the extract to the treatment described above permits the recovery of the diolefins.

Still another method of separating diolefins from a hydrocarbon mixture containing the same, comprises distilling the mixture in a fractionation column of the bubble cap plate, packed column, or other well known type, in the presence of a solvent. In this process, the liquid solvent is introduced continuously into the top of the column. The hydrocarbon mixture containing the diolefins to be separated is introduced continuously into the column at some intermediate point between the top and the bottom of the column. Overhead and bottom products are withdrawn continuously. The diolefins thus introduced, which are preferentially dissolved in the solvent, are concentrated in the liquid bottom product by means of the repeated extractions and rectifications taking place in the column; likewise, the hydrocarbons thus introduced which are not preferentially dissolved in the solvent are concentrated in the overhead product by the same process. When the solvents of this invention are used, the top product contains a very small proportion of solvent, and this may be easily recovered by cooling or by other obvious means. The diolefins are removed from the bottom product by heating and/or reducing the pressure as previously described. Of course, this process may also be carried out in batch operation rather than continuously, in which case a charge of hydrocarbon plus solvent is placed in the still pot or kettle, and the hydrocarbons which are not preferentially absorbed by the solvent are distilled off through the column counter-current to a stream of solvent introduced continuously into the top of the column. The diolefins are thus concentrated in the kettle along with a considerable amount of solvent.

If a single diolefin is desired, for instance butadiene, it will ordinarily be best to fractionate the diolefin-containing hydrocarbon mixture into a relatively narrow boiling range cut containing the diolefin to be purified, before submitting it to action of the solvent. If recovery of a mixture of different diolefins is sought, solvent treatment of the entire mixture will usually be satisfactory. However, after solvent extraction of the entire hydrocarbon mixture, whereby a mixture of diolefins is obtained, fractionation of the diolefin mixture may be used for separating one diolefin from another.

The solvents herein described are especially suited to the recovery of conjugated diolefins and the following examples describe the extraction of butadiene using a preferred solvent of the class described.

*Example I*

To a chilled distilling flask with internal heating element containing 50 grams of dimethyl formamide, was added 51 grams of 49 per cent butadiene in a hydrocarbon mixture comprising largely $C_4$ hydrocarbons. The mixture was distilled through a 30-plate Bruun-type glass laboratory plate column with dimethyl formamide flowing down counter-current to the ascending vapors. The temperatures and compositions of the vapors and flask liquid at two different times during the run were:

| Temperatures, °C. | | Per cent butadiene | |
|---|---|---|---|
| Flask | Vapor | Distillate | Bottoms |
| 54.5 | −6.5 | 1.4 | ------ |
| 75.0 | 4.8 | 1.4 | 79 |

The above results show a concentration of 79 per cent butadiene in the hydrocarbon portion of the bottom liquid, thus showing substantial increase in concentration over the 49 per cent starting material, this increase being obtained in a simple manner.

*Example II*

In a procedure similar to Example I, 40 grams of a hydrocarbon feed containing 80 per cent butadiene and 20 per cent butene-2 was added to the chilled distilling flask containing 50 grams of dimethyl formamide and distilled through the same column counter-current to a stream of dimethyl formamide, with the following results:

| Sample | Temperature, °C. | | Per cent butadiene | |
|---|---|---|---|---|
| | Flask | Vapor | Distillate | Bottoms |
| A | 31 | −0.5 | 2.3 | |
| B | | 20 | 11.0 | |
| C | 63 | 21 | 46.8 | |
| D | 83 | 19 | 62.2 | |
| E | | | | 93.5 |

The final sample taken at the end of the distillation showed a concentration of 93.5 per cent butadiene in the hydrocarbon portion of the liquid. Further increase in concentration could readily be obtained by increasing the size of the column, or by using the concentrated butadiene as feed in another column.

While the foregoing examples show the use of dimethyl formamide as solvent, analogous results may readily be obtained by substituting therefor other solvents of the type described herein.

I claim:

1. A process for the concentration of an aliphatic conjugated diolefin from hydrocarbon mixtures containing the same and other close-boiling more saturated aliphatic hydrocarbons which comprises extracting said mixture with a selective solvent for the diolefin, said solvent being an alkyl N-substituted lower fatty acid amide, and thereby effecting preferential solution of said diolefin in said solvent while allowing said other hydrocarbons to remain undissolved in said solvent, separating the resulting diolefin-enriched solvent phase from said undissolved other hydrocarbons, and recovering the diolefin from said solvent phase.

2. The process of claim 1 wherein said solvent is dimethyl formamide.

3. The process of claim 1 wherein said diolefin is butadiene, said hydrocarbon mixture is an aliphatic $C_4$ mixture and wherein said solvent is dimethyl formamide.

4. A process for the concentration of an aliphatic conjugated diolefin from hydrocarbon mixtures containing the same and other close-boiling less saturated aliphatic hydrocarbons which comprises passing said mixture to a fractional distillation column at an intermediate point therein, continuously introducing dimethyl formamide into the top of said column, continuously withdrawing from the bottom of said column a bottoms product of dimethyl formamide rich in said diolefin and from the top of said column an overhead product of said other hydrocarbons, and recovering the dissolved diolefin from said withdrawn bottoms product.

JAMES H. BOYD, JR.